United States Patent
Nagatomi et al.

[11] Patent Number: 5,991,597
[45] Date of Patent: Nov. 23, 1999

[54] CONVERTER FOR A SATELLITE SIGNAL RECEIVING ANTENNA

[75] Inventors: Akihiko Nagatomi; Toshio Fujita; Masami Tanaka, all of Kobe, Japan

[73] Assignee: DX Antenna Co., Ltd., Hyogo-Ken, Japan

[21] Appl. No.: 08/864,338

[22] Filed: May 28, 1997

[30] Foreign Application Priority Data

May 29, 1996 [JP] Japan ................................ 8-134808

[51] Int. Cl.⁶ .................... H04B 7/14; H04B 7/185; H04B 1/18
[52] U.S. Cl. .................. 455/12.1; 455/20; 455/180.1; 455/188.1; 455/190.1; 348/731
[58] Field of Search ..................... 455/20, 3.2, 22, 455/180.1, 188.1, 190.1, 189.1, 6.1, 315; 348/12.1, 731

[56] References Cited

U.S. PATENT DOCUMENTS

| | | | |
|---|---|---|---|
| 4,214,212 | 7/1980 | Dipietromaria | 455/190 |
| 4,633,513 | 12/1986 | Taney | 455/131 |
| 4,731,877 | 3/1988 | Moon | 455/340 |
| 5,014,349 | 5/1991 | Kudo et al. | 455/189 |
| 5,093,922 | 3/1992 | Kudo et al. | 455/6 |

*Primary Examiner*—Wellington Chin
*Assistant Examiner*—Sheila Smith
*Attorney, Agent, or Firm*—Helfgott & Karas, P.C.

[57] ABSTRACT

A converter for a satellite signal receiving antenna, comprising a input terminal for inputting a signal in a frequency band other than the output frequency band of the IF signal converted from the satellite signal, and where the IF signal and signal from the input terminal are mixed by a mixing circuit, and output through a coaxial cable from the IF output terminal.

9 Claims, 11 Drawing Sheets

(IF/VHF/UHF)

CONVERTER FOR A SATELLITE SIGNAL RECEIVING ANTENNA

FIELD OF THE INVENTION

This invention relates to a system for receiving satellite signals and more particularly to a converter for an antenna for receiving satellite signals.

DESCRIPTION OF THE PRIOR ART

In many cases, the converter for an antenna for receiving satellite signals (referred to as "converter" below) is made such that it connects directly with the primary radiator (feed horn), and it converts the 12 GHz band signal that is picked up by the primary radiator to a 1 GHz IF signal and amplifies it to the signal level required by the receiving device (tuner, receiver). The IF signal is sent from the output terminals of the converter to the receiving device by way of coaxial cable. Also, the converter receives a DC voltage from the receiving device by way of the coaxial cable.

Furthermore, the conventional converter mainly has output terminals for outputting an IF signal from the antenna to the receiving device, but does not have input terminals for inputting a signal from an active antenna. For example, if the signal from the converter is to be mixed with other signals (for example, VHF, UHF signals), a separate mixer is used to mix the signals before these signals are sent to the receiving device along the same coaxial cable. In this case, connecting the cables takes much work, as well as it requires space for installing the mixer and is expensive.

If the antenna for receiving satellite signals is installed on a balcony or the like, and coaxial cable runs from it to the receiving device, there are limitation on the size of the opening for drawing the cable through, and if several coaxial cables are to be drawn, it becomes very difficult, and if several antennas are installed, a lot of installation work and labor is involved.

SUMMARY OF THE INVENTION

Therefore, it is one object of the present invention to provide a system for processing signals from several antennas using one coaxial cable.

It is another object of the present invention to provide a system for connecting different converters for using a single common coaxial cable.

DESCRIPTION OF THE PREFERRED EMBODIMENTS

Figure 1:
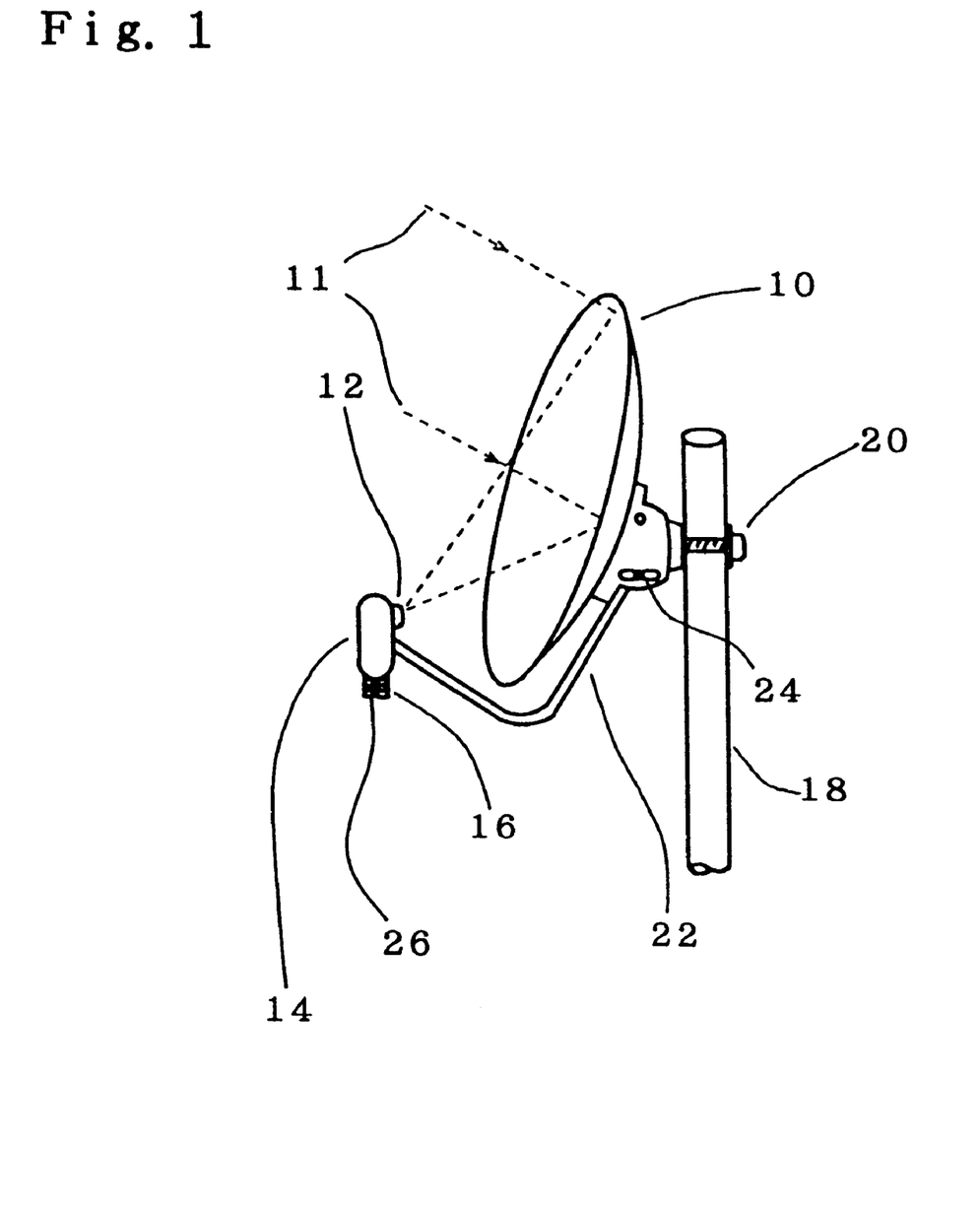
FIG. 1 is a pictorial perspective view of an offset parabola antenna which shows the relationship between the reflector and converter, and an input terminal of this invention.

FIG. 1 shows a first embodiment of this invention where an offset parabola antenna comprises a reflector and a converter.

For antenna systems that receive TV signals or radiowaves from a satellite, such as a DSS (digital satellite system) antennas used in the USA, the radiowaves 11 are received by the reflector 10 and concentrated at a focal point. The radiowaves are then efficiently received by the feed horn 12 that is placed at this focal point, and the 12 GHz band signal is converted to a 1 GHz band signal by the converter 14, then the IF signal is output along a coaxial cable (not shown in the figure) from the output terminal 16 on the converter 14.

The reflector 10 is fixed to an antenna pole 18 by antenna installation fixtures 20, and the converter 14 is fixed to a converter support arm 22. The direction of the reflector 10 can be adjusted by an angle-adjustment fixture 24.

The converter 14 for a satellite signal receiving antenna of this invention has an input terminal 26 for inputting a signal (for example a signal from an active antenna) that has a different frequency band than the frequency band of the IF signal that has been converted and amplified from the frequency of the received satellite signal, thus making it possible to mix or to switch the signals inside the converter 14, thereby outputting the IF signal from the satellite signal together with the signal from the aforementioned input terminal 26 from the output terminal 16 using one coaxial cable.

It is possible for the converter 14 to have one or more output and input terminals.

In order to mix the signals inside the converter 14, a distribution circuit or a branch circuit, as well as a filter circuit that is a combination of a low-pass filter and high-pass filter are desirable.

Moreover, in order to switch the signals inside the converter 14, one way is to have an internal switching circuit which switches and outputs the satellite signal and signal from the input terminal 26. Another way is to pass the signal from the input terminal 26 through an amplifier, and then to switch the amplified signal and non-amplified pass signal before outputting, using the high and low power supply voltage from the receiving device (receiver).

Furthermore, it is desirable to have an internal circuit for supplying power from the output terminal 16 by way of the input terminal 26 to the active antenna or the like which is connected to the input terminal 26. This is detailed later.

Incidentally, the input terminal and output terminal can be made by connectors, or the coaxial cable can be connected directly.

Figure 2:
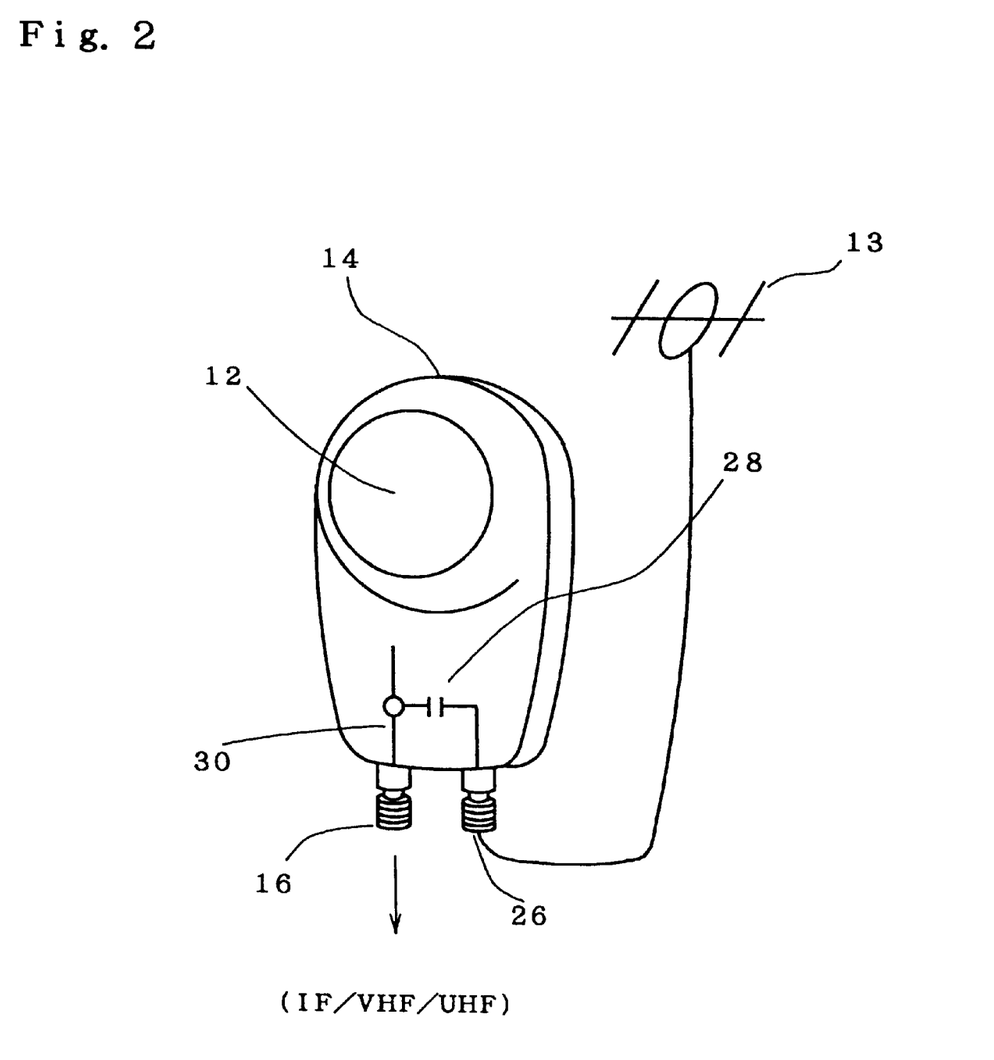
FIG. 2 is a pictorial perspective view of an embodiment of this invention showing a converter that has an input terminal for inputting a signal from a VHF/UHF TV antenna, and output terminal for outputting the IF signal based on satellite signal and VHF/UHF signal from the output terminal.

FIG. 2 shows a basic overview of the converter 14 shown in FIG. 1. In this embodiment of the invention, there is an input terminal 26 for input of other signals such as earth-based VHF/UHF television signals from a VHF/UHF TV antenna 13 or the IF signal from another satellite signal receiving antenna.

Figure 10:
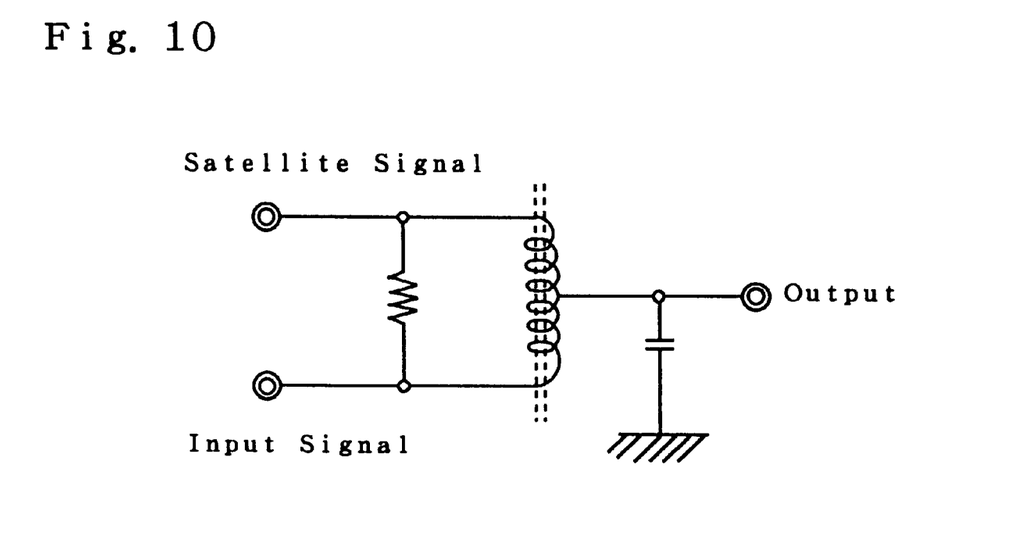
FIG. 10 is a circuit diagram showing an example of a distributor circuit used in this invention.
Figure 11:
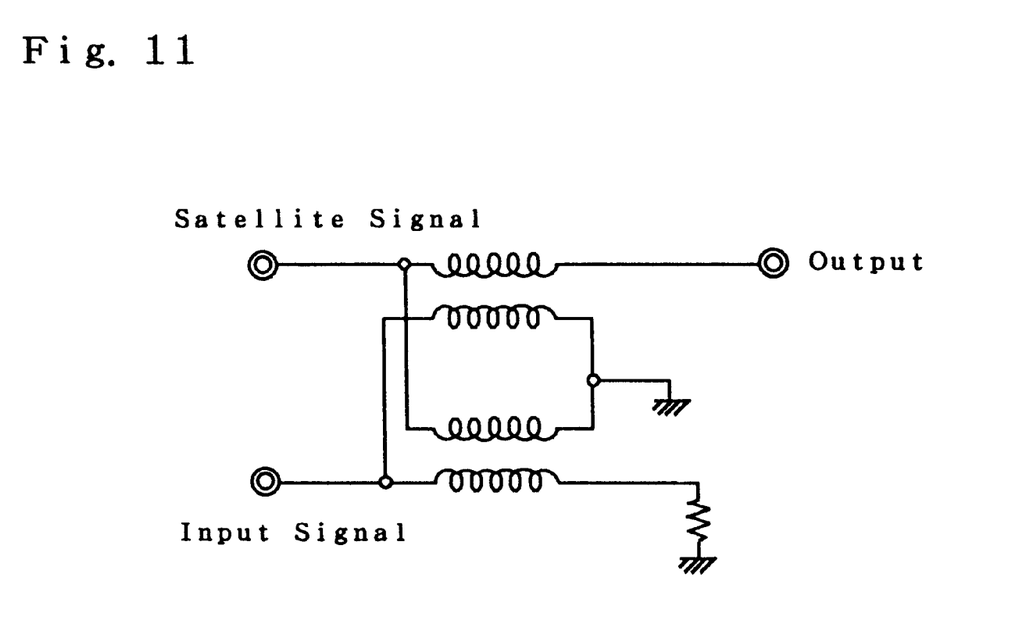
FIG. 11 is a circuit diagram showing an example of a branch circuit used in this invention.
Figure 12:
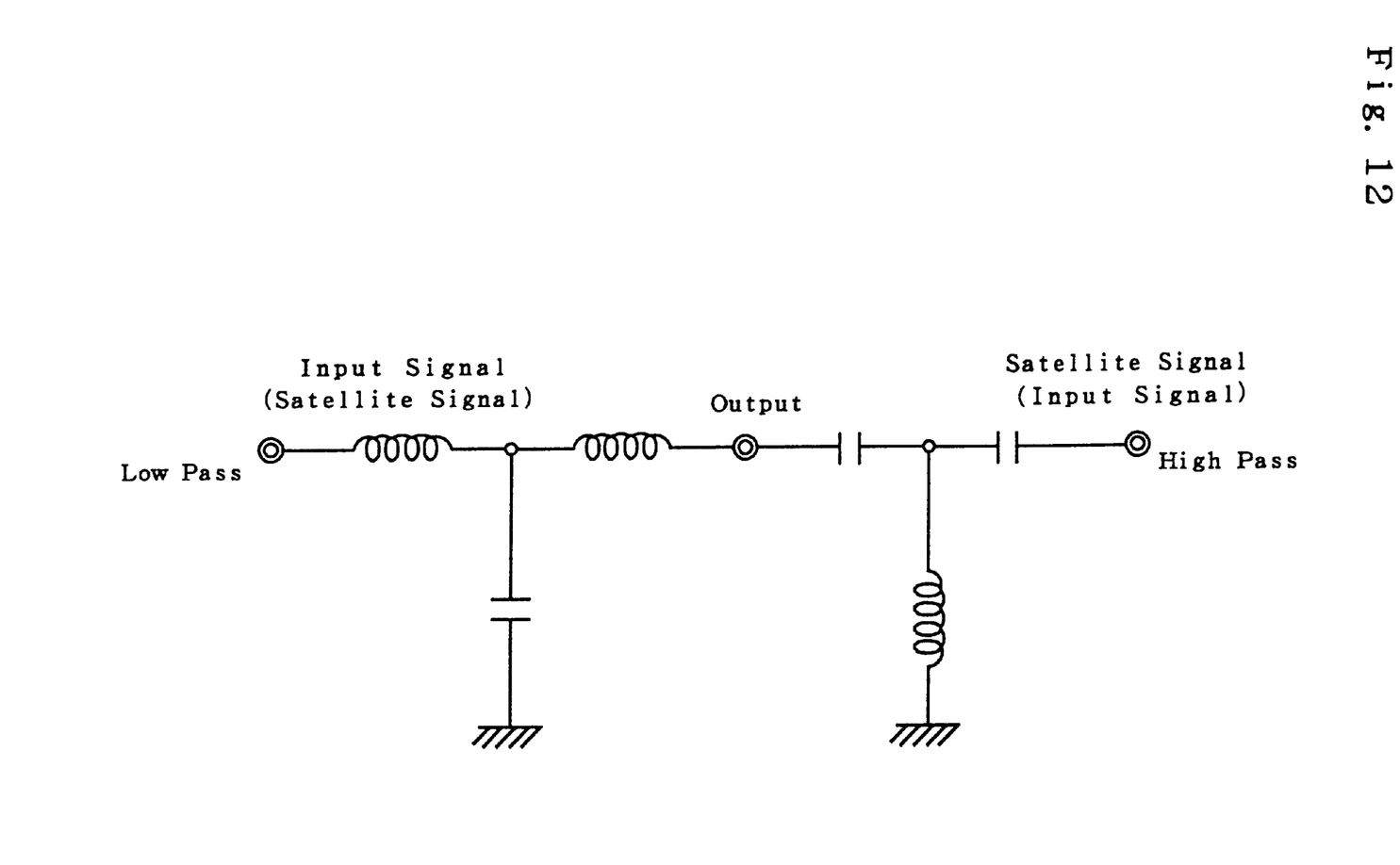
FIG. 12 is a circuit diagram showing an example of a filter used in this invention.

Here, the input terminal 26 is located on the converter 14, and signals from the VHF/UHF TV antenna 13 are input through input terminal 26, and the IF signal based on the satellite signal is output together with the VHF/UHF signal from output terminal 16. A capacitor 28 for preventing the flow of the converter power to the input terminal 26 is installed, and the signal input from the input terminal 26 is mixed with the IF signal inside the converter by a mixing circuit 30 (distribution circuit, branch circuit). Or the signal passes through a filter circuit (low-pass/high-pass filters and/or band-pass/band-illumination filters) and then goes through a switching circuit (not shown in the figure) and then output along a coaxial cable (in the direction of the arrow) which extends from the output terminal 16 on the converter. In some cases, the capacitor 28 can be omitted. Examples of the distribution circuit, branch circuit and filter circuit are shown in FIG. 10, FIG. 11 and FIG. 12, respectively.

Figure 3:
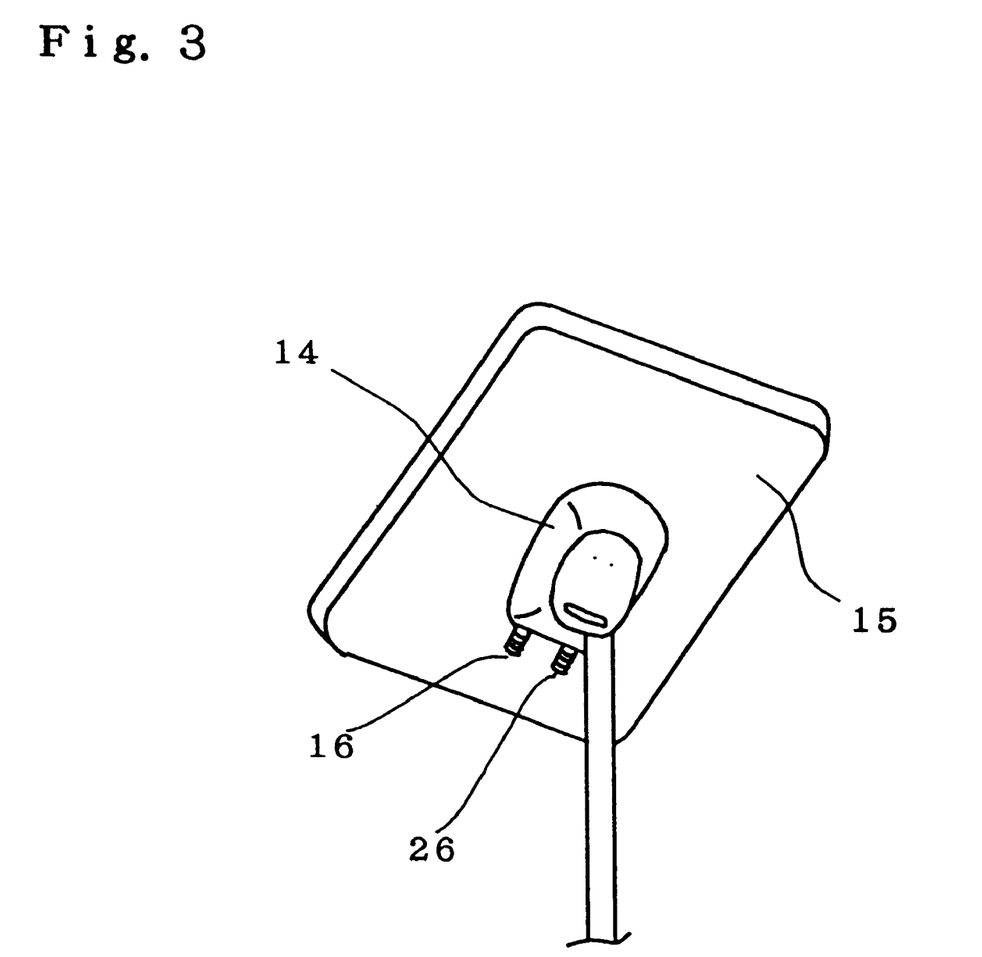
FIG. 3 is a pictorial perspective view showing the position of the converter on a flat antenna.

FIG. 3 shows an embodiment of this invention where the converter 14 is installed on a flat antenna.

Figure 4:
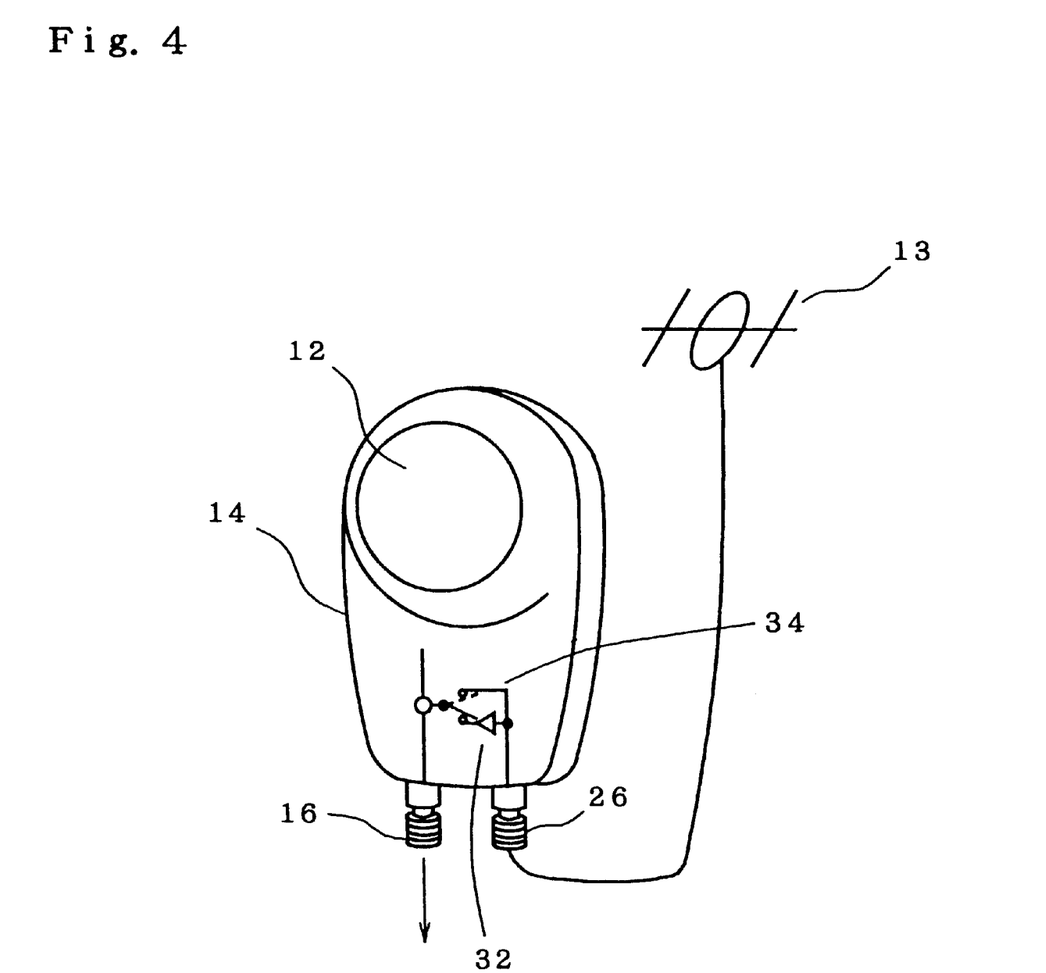
FIG. 4 is a pictorial perspective view of another embodiment of this invention showing a converter that has an input terminal for inputting a signal from a VHF/UHF TV antenna, and output terminal for outputting the IF signal based on satellite signal and VHF/UHF signal from the output terminal.

FIG. 4 shows an embodiment of this invention where a pass circuit 34 is used in which an amplifier 32 for amplifying the signal from the VHF/UHF antenna 13 is installed, and where this amplifier 32 is operated with the converter power supply sent from the satellite receiver (not shown). The signal from the input terminal 26 is amplified by the amplifier circuit 32 located inside the converter 14, and is then mixed with the IF signal. The pass circuit may be omitted, however it is best if there is switching between the amplified signal and the signal which is not amplified and which passes through the pass circuit 34.

Figure 9:
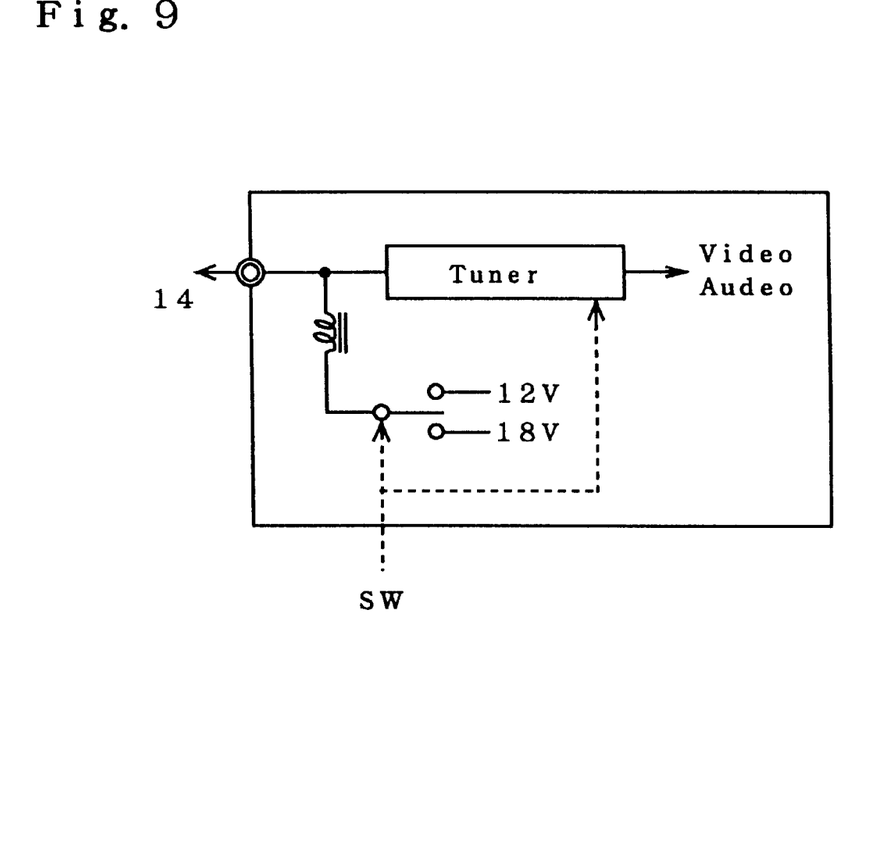
FIG. 9 is an explanatory drawing showing an example of a switching circuit inside the receiving device for switching the supply voltage to the converter between high voltage and low voltage.

As shown in FIG. 9, switching can be controlled by the switching voltage from the satellite receiver for controlling the receiving polarized waves in the converter, specifically by switching the power-supply voltage between low voltage (+12 V) and high voltage (+18 V DC).

If this kind of switch circuit is used, it is possible to process signals with the same frequency as the converter's IF frequency.

Figure 5:
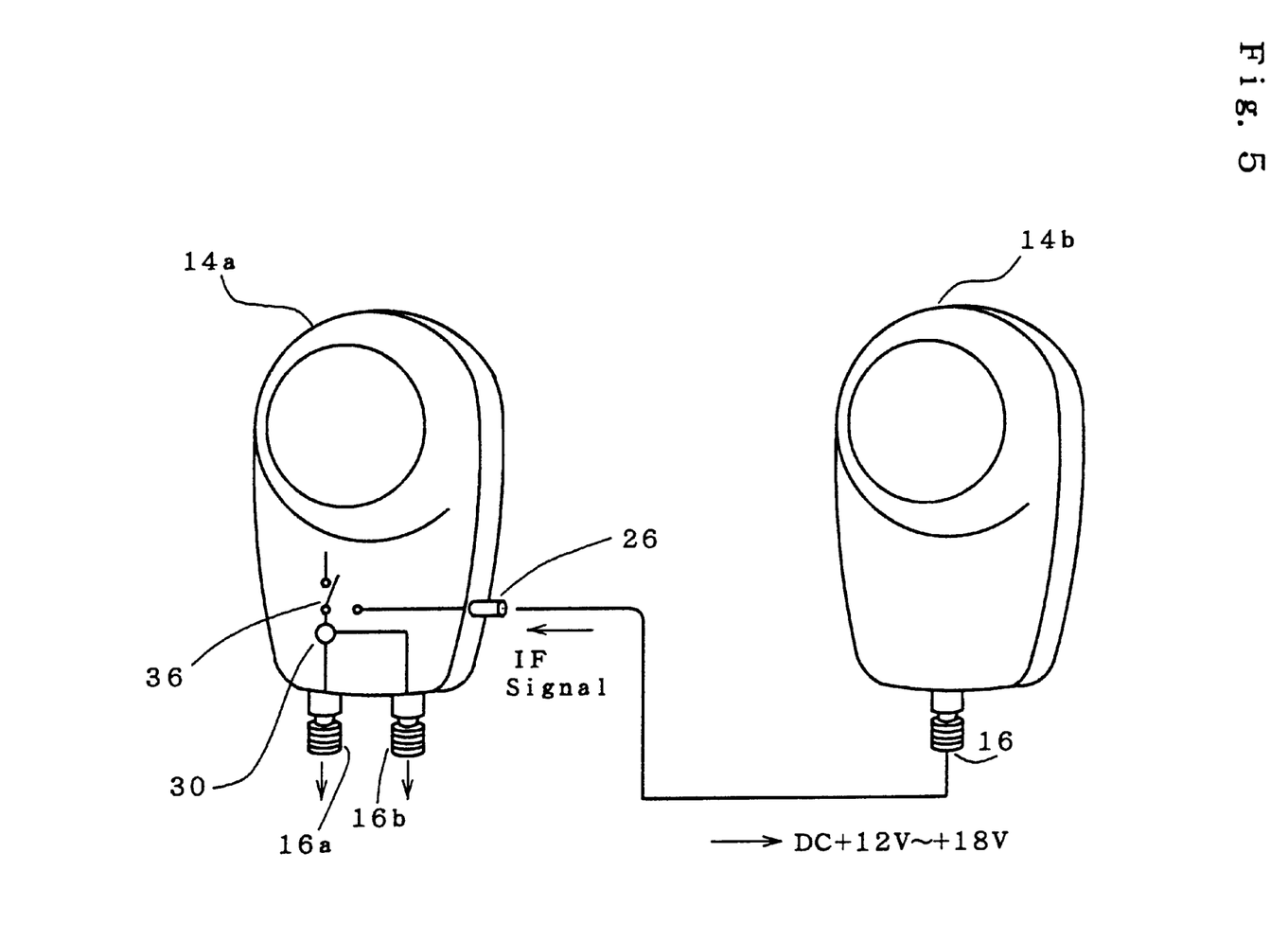
FIG. 5 is a pictorial perspective view showing an example of connecting a coaxial cable from the output terminal of a second converter to the input terminal located on the side of a first converter which has multiple output terminals.
Figure 6:
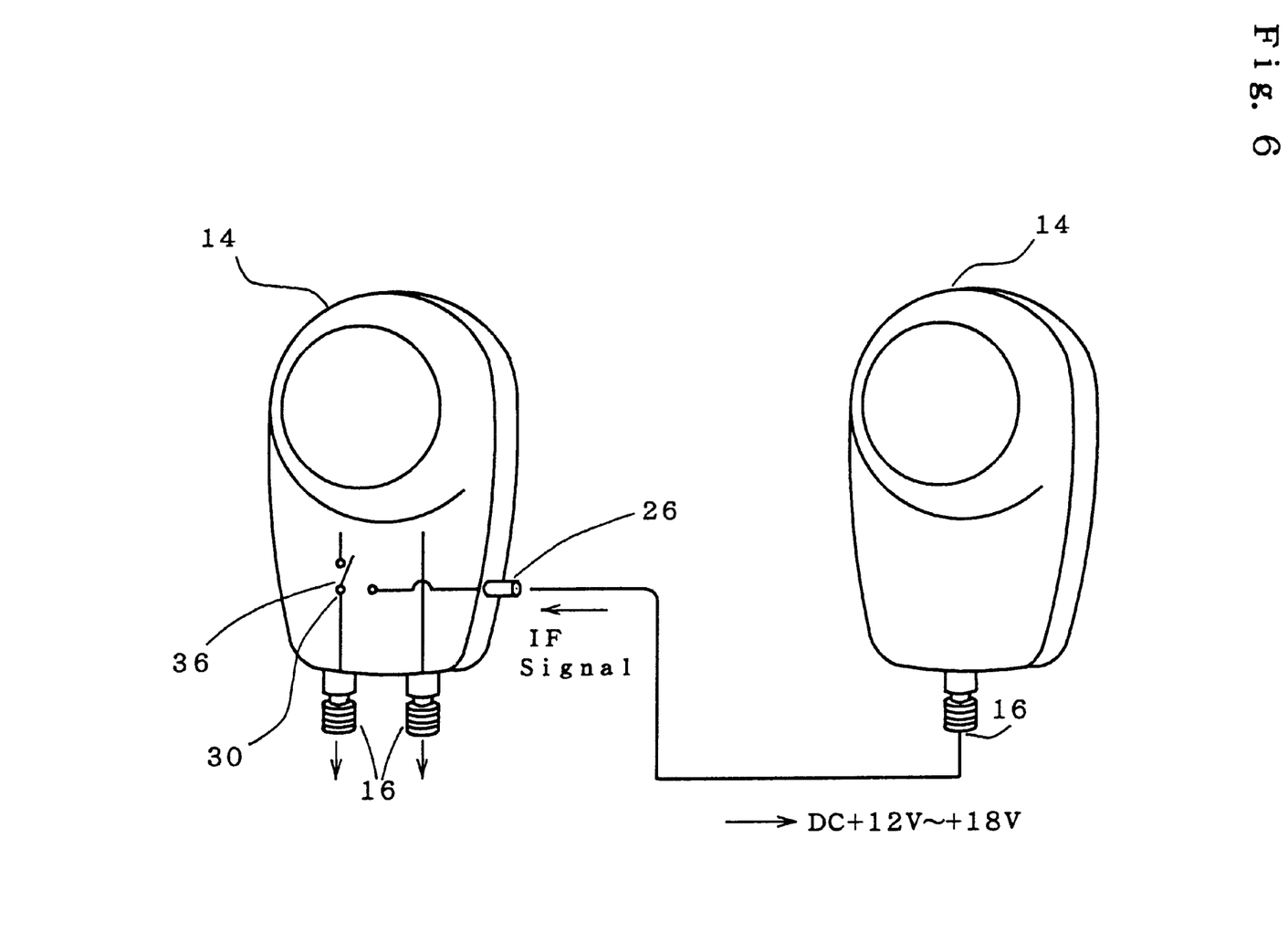
FIG. 6 is a pictorial perspective view showing another example of connecting a coaxial cable from the output terminal of a second converter to the input terminal located on the side of a first converter which has multiple output terminals.

FIG. 5 and FIG. 6 shows an embodiment of a combination of first and second converters 14a, 14b with the converter 14a having two output terminals 16, and the input terminal 26 is located on one side face. In FIG. 5, two output terminals 16 output the same signal to different receiving devices. In FIG. 6, the output terminal 16b on the right of the first converter 14a always outputs the IF signal, and the output of the output terminal 16a on the left is switched between the IF signal of the first converter 14a and IF signal of the second converter 14b. If the input signals have the same frequency or nearly the same frequency so that the filter does not function well to process the signals, it is best to perform switching using a switch 36.

Figure 7:
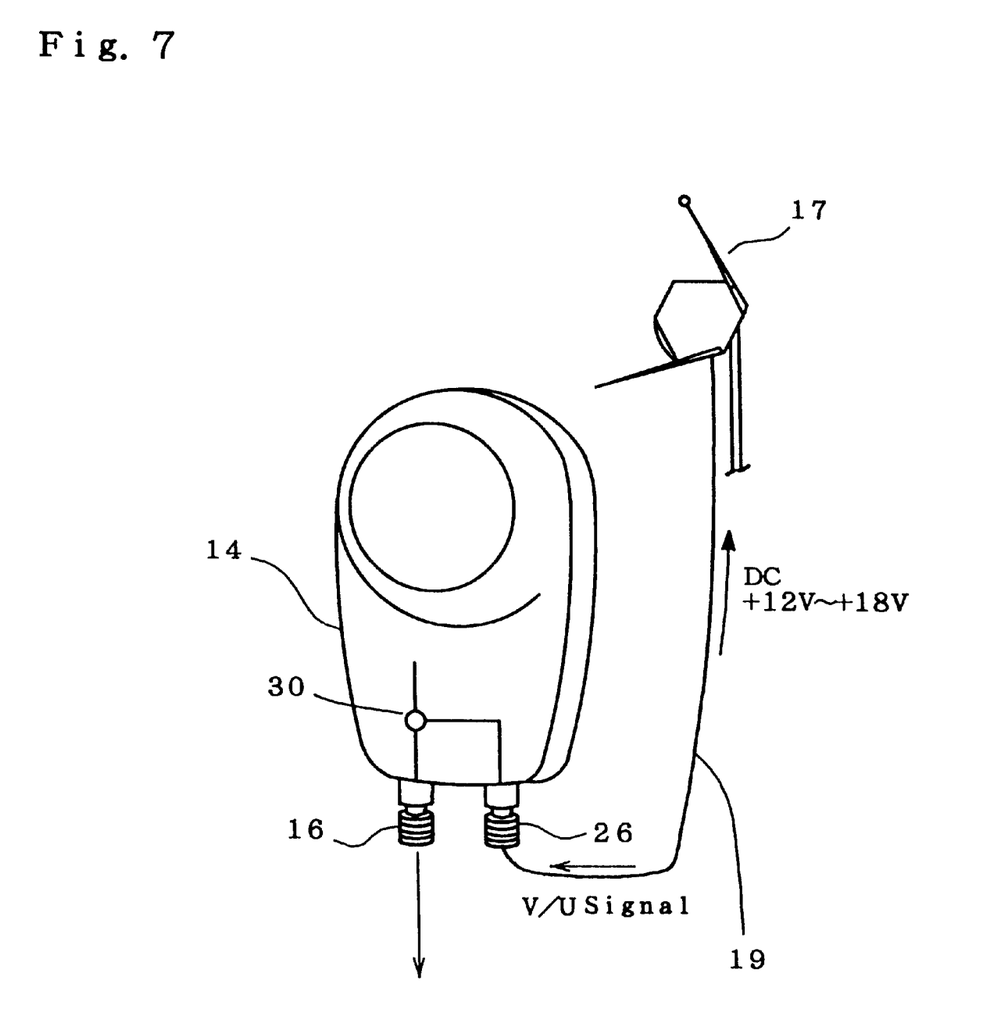
FIG. 7 is a pictorial perspective view of an active antenna connected to the input terminal.
Figure 8:
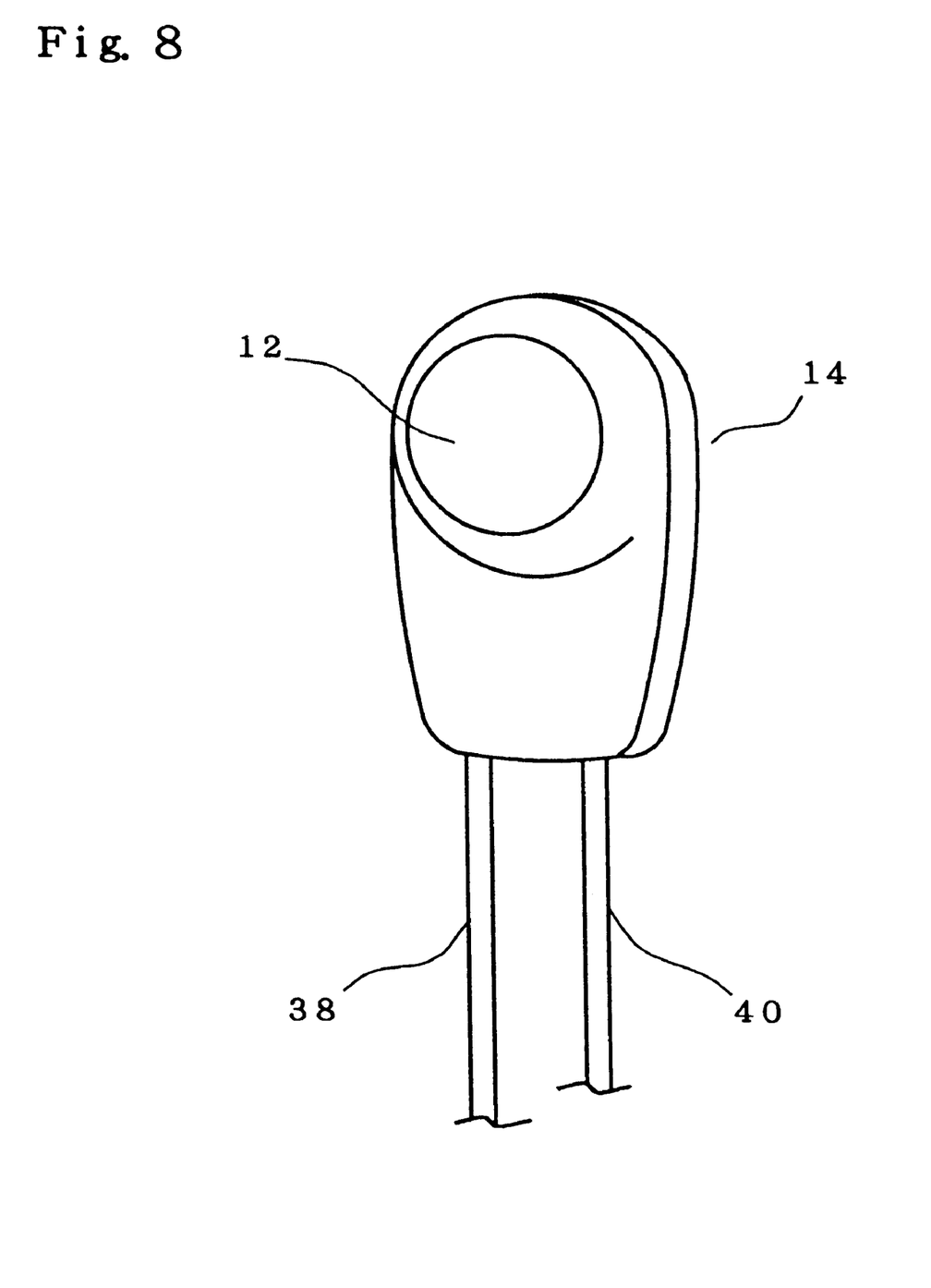
FIG. 8 is a pictorial view of yet another embodiment of this invention where input and output are performed directly using coaxial cables.

FIG. 7 shows another embodiment of this invention. The antenna connected to the input terminal 26 is an active antenna 17 from which V/U signals are sent, and the power supply for the converter, DC+12V and +18V, is also used as the power supply for the active antenna 17. FIG. 8 shows another embodiment of this invention. No connector (terminal) is used for the input or output, but the coaxial cables 38, 40 are directly led from the converter.

This invention may also be applied to a converter with a pilot lamp, level indicator, etc. The present invention improves the situation where a conventional mixer is used, so that the wiring around the antenna becomes very complicated. With the converter of this invention, installing the antenna and running the cables is simplified, as well as assembling being made at a low cost.

What is claimed is:

1. A converter for a satellite-signal receiving antenna comprising an amplifier circuit for frequency-converting and amplifying the satellite signal from a first satellite into an IF signal, at least one input terminal for inputting an IF signal obtained by frequency-converting and amplifying the satellite signal from a second satellite, a switching circuit for switching between the IF signal from said circuit and the IF signal from said input terminal, and at least one output terminal for outputting said IF signal along a coaxial cable.

2. The converter for a satellite-signal receiving antenna of claim 1, wherein a mixing circuit comprises a distribution circuit, a branching circuit or a combined lowpass and high-pass filter circuit.

3. The converter for a satellite-signal receiving antenna of claim 1, where an active antenna is connected to the input terminal, and where power is supplied to said active antenna from the output terminal by way of the input terminal.

4. The converter for a satellite-signal receiving antenna of claim 1, where an active antenna is connected to the input terminal, and where power is supplied to said active antenna from the output terminal by way of the input terminal.

5. The converter for a satellite-signal receiving antenna of claim 1, where an active antenna is connected to the input terminal, and where power is supplied to said active antenna from the output terminal by way of the input terminal.

6. A converter for a satellite-signal receiving antenna which is connected to a receiver device to output an IF signal the frequency of which has been converted and amplified from the satellite signal, the converter comprising an input terminal connected to one of an active antenna and another converter for inputting another signal, a mixing circuit for mixing the IF signal and the another signal input from the input terminal, and a common output terminal for outputting the mixed signal therefrom wherein power is supplied to the one of the active antenna and the another converter from the output terminal by way of the input terminal.

7. A converter for a satellite-signal receiving antenna which is connected to a receiver device to output an IF signal the frequency of which has been converted and amplified from the satellite signal, the converter comprising an input terminal connected to one of an active antenna and another converter for inputting another signal, a switch circuit for switching between the IF and another signal, an amplifying device by which the signal from the input terminal is amplified, a switch device by which the amplified signal and non-amplified pass signal are switched by switching between high and low voltage from power supply from the receiver device before outputting, and a common output terminal for outputting the switched signal therefrom, wherein power is supplied to the one of the active antenna and the another converter from the output terminal by way of the input terminal.

8. A converter for a satellite-signal receiving antenna which is connected to a receiver device to output an IF signal the frequency of which has been converted and amplified from the satellite signal, the converter comprising at least one input terminal connected to one of an active antenna and another converter for inputting signals of a frequency band that differs from the output frequency band of the If signal, a switch circuit for switching between the IF signal and the signal input from said input terminal, an amplifying device by which the signal from the input terminal is amplified, a switch device by which the amplified signal and non-amplified pass signal are switched by switching between high and low voltage from power supply from the receiver device before outputting, and at least one output terminal for outputting the signal, wherein power is supplied to the one of the active antenna and the another converter from the output terminal by way of the input terminal.

9. A converter for a satellite-signal receiving antenna which is connected to a receiver device to output an IF signal the frequency of which has been converted and amplified from the satellite signal, the converter comprising at least one input terminal connected to one of an active antenna and another converter for inputting signals of a frequency band that differs from the output frequency band of the IF signal, a mixing circuit for mixing the IF signal and the signal input from said input terminal, and at least one output terminal for outputting the signal, wherein power is supplied to the one of the active antenna and the another converter from the output terminal by way of the input terminal.

* * * * *